H. VANDERBEEK.
SIGNALING DEVICE.
APPLICATION FILED DEC. 21, 1916.
1,377,161.
Patented May 3, 1921.
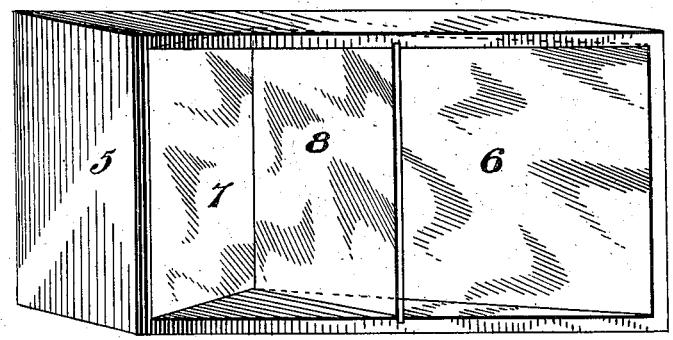
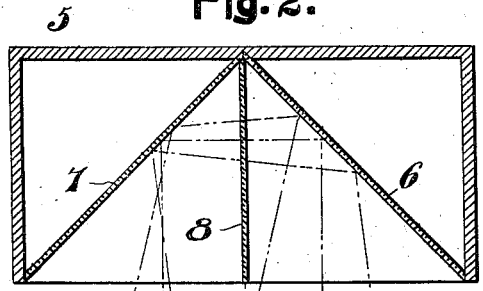
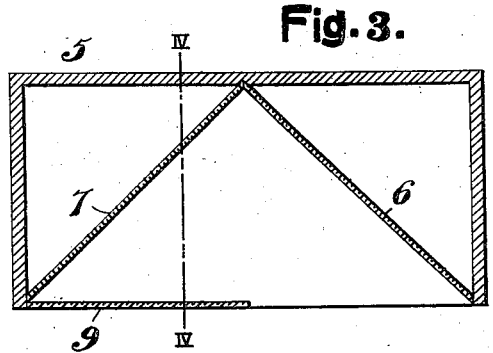
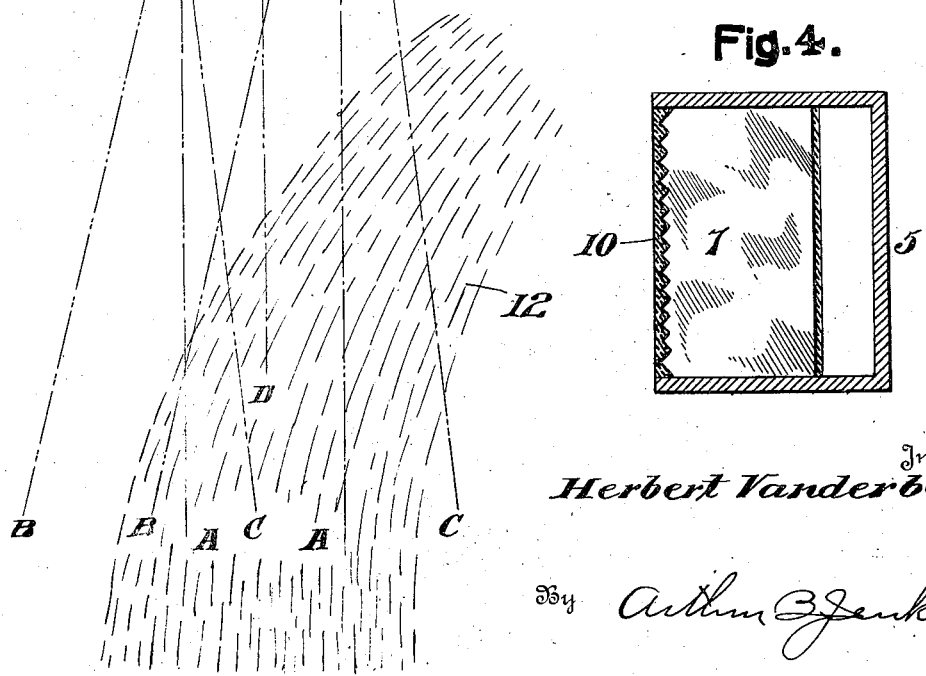
Inventor
Herbert Vanderbeek
By Arthur B. Jenkins,
Attorney

UNITED STATES PATENT OFFICE.

HERBERT VANDERBEEK, OF CANTON, OHIO.

SIGNALING DEVICE.

1,377,161.      Specification of Letters Patent.      Patented May 3, 1921.

Application filed December 21, 1916. Serial No. 138,278.

*To all whom it may concern:*

Be it known that HERBERT VANDERBEEK, a citizen of the United States, residing at Canton, in the county of Stark and State of Ohio, has invented certain new and useful Improvements in Signaling Devices, of which the following is a specification.

My invention relates to the class of devices that are used as a warning or danger signal at dangerous points on routes of travel and that make use of the lights commonly carried by vehicles as a means for illuminating the signal, and an object of my invention, among others, is to provide a signal device that shall be extremely simple in its construction, that shall be highly efficient as to power, that shall not require elaborate foundations for its support and that shall require comparatively little skill to properly place it in position.

One form of signaling device embodying my invention and in the construction and use of which the objects herein set out, as well as others, may be attained is illustrated in the accompanying drawings in which—

Figure 1 is a perspective view of a signaling device embodying my invention.

Fig. 2 is a view in horizontal section through said device showing on a very much reduced scale a source of light in the form of headlight supported on an automobile.

Fig. 3 is a view similar to Fig. 2 but illustrating a slightly different arrangement of the colored member.

Fig. 4 is a view in vertical section illustrating an arrangement of parts to simplify vertical adjustment.

While my improved signaling device is especially intended for use on highways used by automobiles and like vehicles and is to be placed at sharp curves or turns, cross roads, railway crossings or similar dangerous points, it will be understood that it may be effectively employed on all routes of travel for different kinds of vehicles that carry lights.

In the accompanying drawings the numeral 5 indicates a case that is preferably closed on all sides except the front and that may be constructed of any suitable material. Two reflectors 6 and 7 are arranged vertically within the case, that is, they are arranged substantially at right angles to the plane of the bottom of the case that forms a base with respect to which the mirrors are definitely positioned, these reflectors being flat, and they are positioned with their planes at right angles each to the other. They may be constructed of any suitable material, and it is intended that the device shall be so placed that the light or lights from approaching vehicles shall strike both of the reflectors when the vehicle is at a considerable distance therefrom and up to a point quite close thereto. It is also intended that the device shall be so placed that the planes of the reflectors shall be located substantially at right angles to the plane of movement of the approaching vehicle, that is, at substantially right angles to the average level of the road over which a vehicle will pass in approaching the device. When so placed it will be seen that the rays of light from such vehicle will be thrown back thereto in parallel lines, as denoted by the dotted lines A, A, B, B, C, C, and that therefore practically all of the light that is projected from the lights of the vehicle on to the reflectors will be returned to the occupants of the vehicle, irrespective of which side of the center line D from the reflectors the vehicle may be located on. This gives to the device a very high degree of efficiency, and for comparatively long distances, as when the device is located at the side of a road, as it usually will be, the vehicle, 11, when its lights first strike the device, may be located on one side of the center line D, and as the vehicle approaches nearer the device it will gradually draw toward said center line D and may pass to the opposite side thereof, but in all of these positions substantially all of the light thrown on to the reflectors will be returned to the vehicle.

This high efficiency is of particular advantage when it is desired that the device shall reflect a colored light, as red, as is commonly desirable in the uses of the device to indicate danger, the projection of the rays in the manner above described causing such colored light to be of maximum brightness for such color. Such a colored light may be produced by placing a colored glass across the front of the device through which the light rays may be projected, but in order to maintain the high efficiency of the apparatus I have devised a special arrangement of this colored member 8 in which it is located between the two reflectors. It is preferably of the same height as the reflectors and preferably extends along the center line D to the front of the case. By this arrangement it will be seen that each ray of light passes only once through the colored member and is thus maintained as to strength that is not materially reduced as it would be by passing several times through the colored member. The colored rays thus produced may be seen for long distances.

In Fig. 3 of the drawings I have shown a slightly different arrangement of this colored member in which the light rays pass only once through it. In this arrangement the colored member 9 extends across the front of the case from one side to the vertical center and from top to bottom.

It will be seen that the device above described practically eliminates all necessity for close horizontal adjustment thereof, that is, a movement on a vertical axis, for, so long as it is set somewhere near the right position on a horizontal plane the rays will strike an approaching vehicle at some point before reaching the device. More attention must be paid, however, to its vertical adjustment, or movement thereof on a horizontal axis in order that the rays shall not be thrown over the head of the occupant of an approaching vehicle, and this single adjustment therefore becomes a very simple matter, but in order to avoid necessity for a close vertical adjustment, if desired the device may be provided with a horizontally ribbed transparent member 10 arranged across the front of the case, as shown in Fig 4, that will refract the entering and leaving rays slightly and thereby increase the vertical height of the effective area illuminated by the device.

I claim:

1. A signaling device comprising a support and flat reflectors located thereon at substantially right angles one to another and vertical with respect to said support, whereby rays of light projected on one reflector will be projected back from the other reflector in lines parallel to those in which they travel to said reflectors, and a colored member located on a plane passing centrally between the plane faces of the reflectors.

2. A signaling device comprising a support located within view of a route traveled by vehicles and having a plural number of flat reflectors positioned at substantially right angles to one another and vertically with respect to said support, and a colored member so placed that each ray of light passing to and from the reflectors will pass only once through said colored member.

3. A signaling device comprising a support located within view of a route traveled by vehicles and having a plural number of flat reflectors positioned at substantially right angles one to another and vertically with respect to said support, and a colored member projecting between said reflectors and located at the same angle with respect to each, whereby rays of light projected on one reflector will be projected back from the other reflector in lines parallel to those in which they travel to said reflectors, and whereby said rays in passing to and from the reflectors will pass only once through said colored member.

In testimony whereof I hereto affix my signature.

HERBERT VANDERBEEK.